June 4, 1963 R. R. SISLER 3,092,230
CLUTCH CONTROL ARRANGEMENT
Filed March 16, 1961 2 Sheets-Sheet 1

INVENTOR.
ROBERT R. SISLER
BY *Derek P Lawrence*
HIS ATTORNEY

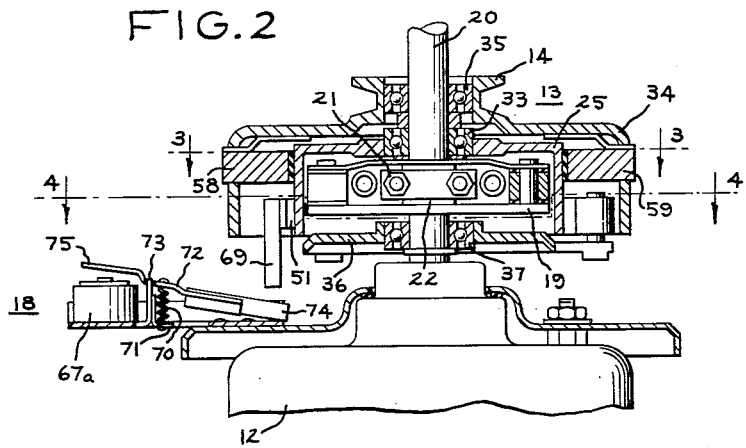
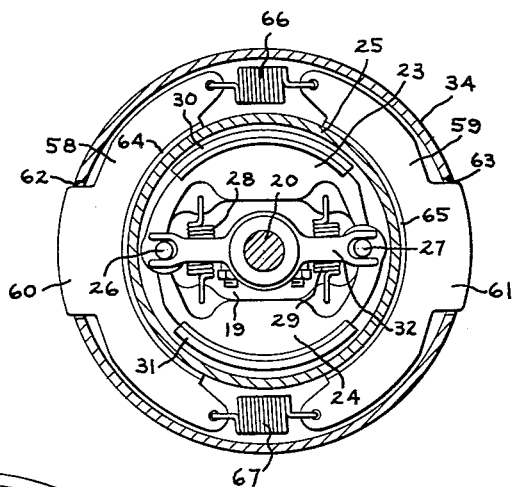
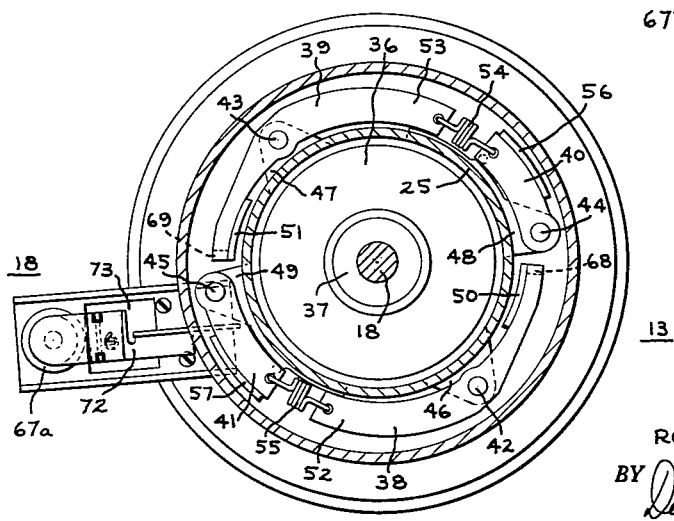
INVENTOR.
ROBERT R. SISLER
HIS ATTORNEY

United States Patent Office 3,092,230
Patented June 4, 1963

3,092,230
CLUTCH CONTROL ARRANGEMENT
Robert R. Sisler, Louisville, Ky., assignor to General Electric Company, a corporation of New York
Filed Mar. 16, 1961, Ser. No. 96,275
8 Claims. (Cl. 192—105)

This invention relates to clutches, and more particularly to a control arrangement for effecting or precluding connection of driving and driven members in a clutch of the centrifugal type.

Clutches of the type wherein connection of the driving and driven members is effected by a speed responsive intermediate member are quite common. In such clutches, the rotation of the driving member causes, by a limited amount of friction or the like, a slow acceleration of the intermediate member; at some pre-determined speed, centrifugal force causes the intermediate member to lock driving and driven members together. In this type of structure, it is possible therefore to prevent engagement of the driving and driven members by precluding rotation of the intermediate member at the speed required to cause centrifugal force to provide the connecting action.

In order to prevent, when desired, the rotation of the intermediate member, it has been conventional in the past to provide a brake shoe which may be moved by controlling means into rubbing engagement with an annular surface of the intermediate member. Such a structure prevents the rotation of the intermediate member when the brake shoe engages it, but allows the intermediate member to come up to the connecting speed when the brake shoe is removed. Such a structure has the advantage that, even if actuated by the control means during high speed rotation of the intermediate member, no substantial damage can occur; however, it will be seen that in such an arrangement the control means must be strong enough to counteract the tendency of the intermediate member to rotate. In other words, the control means not only controls the movement of the brake shoe but also causes the shoe to exert its positive restraining or braking force.

A substantially more economical means of preventing rotation of the intermediate member is to cause the control means to move a stop member into the path of rotation of a stop section formed on the intermediate member. The control means then need exert only the very small force required for the moving of the stop member; the stop member itself exerts the stopping force by virtue of engagement with the stop section of the intermediate member. However, despite the advantages, such a structure has not heretofore been used because of the danger that, during high speed rotation of the intermediate member, the stop member might accidentially be actuated to its operative position whereupon there would be a high speed impact between the stop member and the stop section of the intermediate member. This would almost inevitably result in damage to the structure.

In order to provide the economic advantages of such a structure, while avoiding the undesirable possibility of damage due to incorrect operation, I propose to provide the stop section as part of means formed on the intermediate member which moves in response to centrifugal force. When the centrifugally responsive means moves because the rotational speed of the intermediate member is increasing, the stop section moves to a position where it cannot be engaged by the stop member regardless of the position of the stop member. By so arranging the various components, a definite and relatively low limit is placed on the speed at which impact between the stop section of the intermediate member and the stop member can occur. Thus the possibility of damage is avoided while the economically desirable results are obtained.

It is therefore an object of my invention to provide a new and improved clutch control arrangement for centrifugal type clutches wherein an economical control means may be provided for determining whether the driving and driven members are connected.

A further more specific object of my invention is to provide such a construction in which the economy is achieved by causing the control member to provide only the function of moving the stop member, the actual work of preventing rotation of the centrifugally responsive part of the clutch being provided by the stop member and not by the control means.

Yet a further object of my invention is to achieve the relationship described in the object immediately hereabove, while at the same time preventing any possibility of damage to the clutch parts through inadvertent operation of the control means during high speed rotation of the centrifugally responsive means.

In carrying out my invention in one form thereof, I provide a clutch having coaxial driving and driven members which may be connected by connecting means yieldingly driven by and coaxial with the driving member. The connecting means includes means which is movable from a first to a second position at a predetermined speed in response to centrifugal force. In its second position the movable means connects the driving member to the driven member. A stop section is formed on the movable means so that the radial position of the stop section is changed when the movable means moves from its first to its second position. In conjunction with the foregoing clutch parts, I provide control means wherein a controlled stop member is movable between an operative and an inoperative position. When this control member is in its inoperative position, it is removed from the path of the stop section in either radial position thereof. However, when the control member is in its operative position it is directly in the path of the stop section when the stop section is in that one of its radial positions it assumes below the predetermined speed. However when the stop section is moved to its second radial position by centrifugal force, it moves to a position where the control member, even in its operative position, is not in the path of the stop section.

By thus limiting the speed at which the stop section may strike the control member, the possibility of damage from the actuation of the control member to its operative position during high speed rotation of the movable member is eliminated.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

In the drawings,

FIGURE 2 is a fragmentary side elevational view showing the improved clutch arrangement of my invention, the mechanism being shown in section to illustrate details;

FIGURE 3 is a sectional view taken on line 3—3 of FIGURE 2; and

FIGURE 4 is a sectional view taken on line 4—4 of FIGURE 2.

Figure 1:
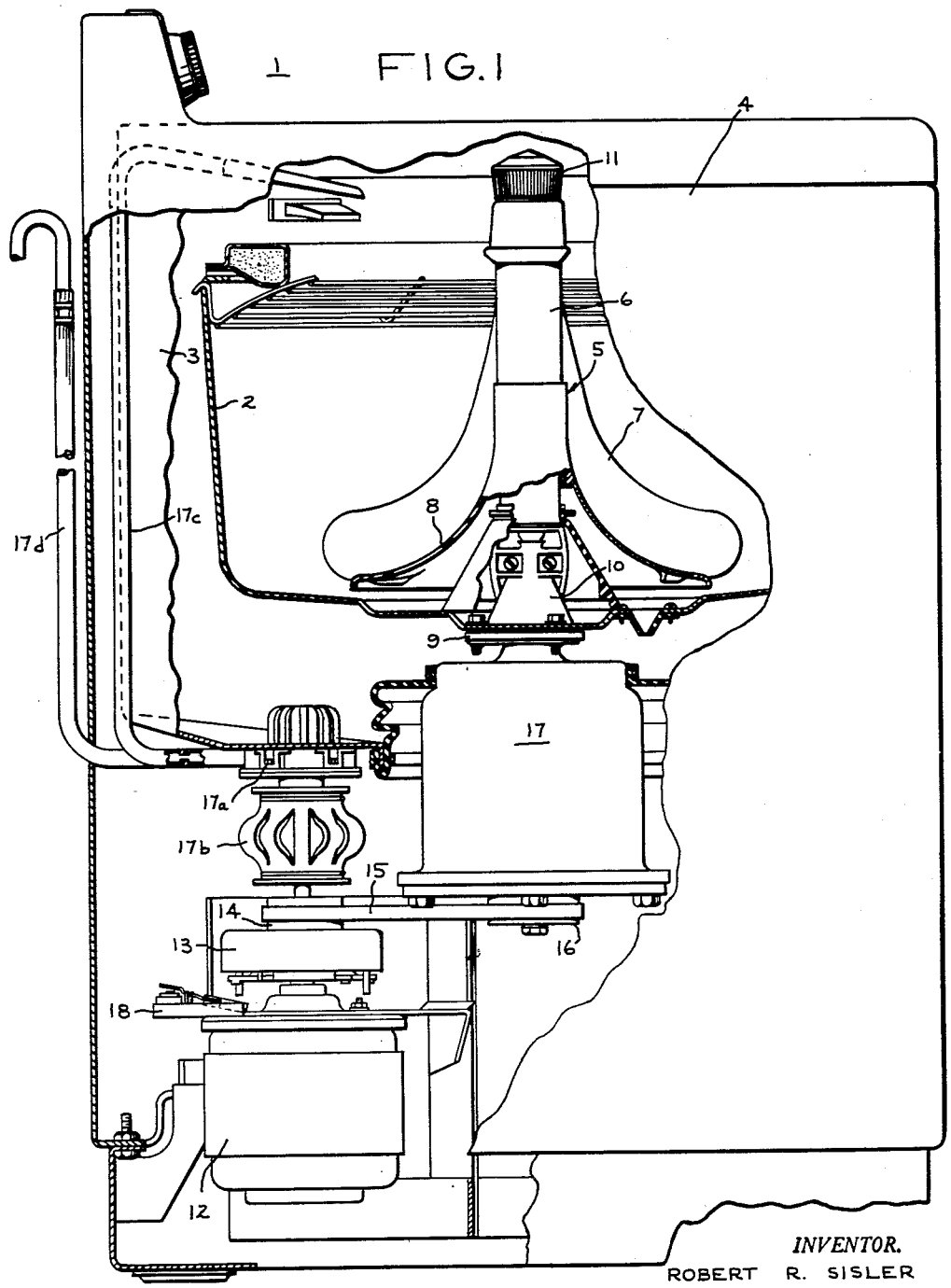
FIGURE 1 is a side elevational view of a typical machine, in this case a clothes washing machine, including a two speed clutch using the improved control arrangement of my invention, the view being partially broken away and partially in section to show details.

Referring now to FIGURE 1, I have shown therein, as typical of machines in which my invention may profitably be used, an agitator type clothes washing machine 1. Machine 1 includes a clothes basket 2 which is disposed within an outer imperforate tub or casing 3. Tub 3 is in turn mounted within an appearance cabinet 4 which includes a hinged cover (not shown) for providing access to the clothes basket. At the center of basket 2 there is positioned a vertical axis agitator 5 which includes a center post 6 and a plurality of radially extending vanes 7. The agitator is further provided with an outwardly and downwardly flanged skirt 8 to which vanes 7 are joined at their lower ends. Both the clothes basket 2 and the agitator 5 are rotatably mounted. The basket is mounted on a flange 9 of a rotatable hub 10, and the agitator 5 is mounted on a shaft (not shown) which extends upwardly through the hub 10 and the center post 6. The agitator is secured to the shaft by means of an internally threaded nut or cap 11 at the top of the center post.

During the cycle of operation of machine 1, the agitator is first oscillated back and forth within basket 2 to wash the clothes therein. Then, after a predetermined period of this washing action, basket 2 is rotated at high speed to extract centrifugally the washing liquid and discharge it into the outer tub 3. Following this extraction operation, a supply of clean liquid is introduced into the wash basket for rinsing the clothes and the agitator is again oscillated. Finally, the basket is once more rotated at high speed to extract the rinse water and discharge it into the outer tub.

Within the machine, agitator 5 and clothes basket 2 may be driven at two different speeds. Specifically, the agitator 5 may be driven at a higher speed to produce a strong washing action and at a lower speed to produce a more delicate washing action. Similarly, the wash basket 2 may be rotated at a high rate of speed to produce a strong extraction operation and at a somewhat lower speed to produce a more delicate extraction operation. By conventional manual controls (not shown), the operator may select whatever of these actions, strong or delicate, is suitable for the type of clothes being washed.

In the drive arrangement, the basket 2 and the agitator 5 are driven from a reversible motor 12. Motor 12 is provided with only a single set of run windings and always rotates at substantially the same rate of speed when energized; the relative polarity of its starting and run windings may be reversed so as to cause the rotation of the motor to be reversed. In order to obtain two different speeds of operation for the agitator 5 and the basket 2, there is connected to the drive motor a clutch mechanism 13. Mechanism 13 includes an output pulley 14 and, depending upon the selection of the operator, the mechanism is effective to drive pulley 14 at either the speed of the motor 12 or at a predetermined lower speed. In other words, the mechanism is effective to provide a direct drive between the motor 12 and the output pulley 14 or alternatively effective to produce a reduced speed drive of the pulley 14. The construction and arrangement of the mechanism 13, while described in detail hereinafter in order to clarify the operation of my invention, are fully described and claimed in Patent 2,869,699 issued on January 20, 1959, to John Bochan, and assigned to General Electric Company, assignee of the present invention.

The output pulley 14 of the two speed clutch is connected by means of a belt 15 to the input pulley 16 of a transmission assembly 17. Transmission 17 is so arranged that it supports and drives both the agitator drive shaft and the basket mounting hub 10. When pulley 16 is driven in one direction (which may be assumed to be the clockwise direction looking down on the motor in FIGURE 1) by the output pulley 14 of the mechanism 13, the transmission causes the agitator 5 to oscillate within the basket 2. Conversely, when the pulley 16 is driven in the opposite direction (which may, again for illustration, be assumed to be the counterclockwise direction of rotation looking down upon the motor in FIGURE 1), the transmission drives the wash basket 2 and the agitator 5 together at a high speed for centrifugal extraction. Thus, the operation carried out, that is, agitation or centrifugal extraction, is controlled by the direction of rotation of the drive motor, agitation occurring when the motor turns in one direction and centrifugal extraction occurring when it turns in the other direction. Whether agitation and centrifugal extraction will be low speed or high speed depends upon the action of the mechanism 13. If mechanism 13 provides a direct drive between motor 12 and pulley 14, high speed agitation and centrifugal extraction are effected, but if the mechanism provides a reduced speed drive, a lower speed agitation and centrifugal extraction are effected. Mechanism 13, incidentally, is unaffected by the direction in which the drive motor is turning; it produces the same action no matter in which direction the drive motor is rotating.

Motor 12 is also directly connected to a pump 17a through a flexible coupling 17b. During agitation the direction of pump rotation passes liquid from tub 3 into conduit 17c so that it is recirculated into basket 2. During reverse motor direction, the pump discharges into a conduit 17d leading to a suitable drain line. While any suitable pump may be used, a suitable one is described and claimed in Patent 2,883,843 issued to John Bochan on April 28, 1959, and assigned to the General Electric Company, assignee of the present invention.

With regard to the transmission assembly 17, it will be understood that this assembly forms no part of the present invention, and that any suitable transmission assembly may be used. However, reference is made to Patent 2,844,225 issued on July 20, 1958, to James R. Hubbard et al. and assigned to General Electric Company, assignee of the present invention. That application discloses in detail the structural characteristics of a transmission assembly suitable for use in the illustrated machine.

Referring now to FIGURES 2, 3, and 4, there is shown therein the construction and arrangement of the two speed clutch 13 and of a control arrangement, generally indicated by the numeral 18, provided for determining whether high or low speed is to be transmitted to the agitator and basket. As shown in FIGURE 2, mechanism 13 includes a clutch carrier plate 19 attached to drive shaft 20 of motor 12 for rotation therewith. Carrier plate 19, which comprises a generally horizontally extending oblong member (see also FIGURE 3), may be secured to shaft 20 in any suitable manner but is shown in FIGURE 2 as being secured to the shaft by means of the clamp 21. Specifically, carrier plate 19 is provided with an upwardly extending hub 22, and the clamp 21 clamps hub 22 securely to the shaft 20.

Carrier plate 19 has mounted on it a pair of speed responsive centrifugally operated clutch shoes 23 and 24 (FIGURE 3) which are adapted to clutch the carrier plate 19 to an independently rotatable drum member 25 journalled on shaft 20. As shown in FIGURE 3, the clutch shoes 23 and 24 for driving drum 25 are mounted respectively on the carrier plate 19 by means of mounting pins 26 and 27, and they are biased inwardly toward each other by means of a pair of tension springs 28 and 29 connected between them. Specifically, tension springs 28 and 29 hold the shoes 23 and 24 in the illustrated position when plate 19 is stationary so that the friction pads 30 and 31 provided on their outer surfaces do not engage the drum 25. In other words, when input shaft 20 is not rotating, springs 28 and 29 prevent clutch shoes 23 and 24 from clutching the input shaft to the drum 25. It will be noted incidentally that the clutch shoes 23 and 24 are positively held on their respective pivot pins 26 and 27 by means of a retainer member 32 which is mounted on the shaft 20 and which includes forked end portions fitted around the pivot pins and over the clutch shoes.

When carrier plate 19 is rotated by shaft 20, at that time the clutch shoes 23 and 24 tend to pivot outwardly on the pins 26 and 27 due to the centrifugal force created by their rotation. This tendency of the shoes to pivot outwardly is restrained by the springs 28 and 29 until such time as the centrifugal force becomes greater than the holding force of the springs. Then, however, the clutch shoes do pivot outwardly so that their friction surfaces 30 and 31 engage the drum 25. Drum 25, as shown in FIGURE 2, is journaled on the shaft 20 by means of a ball bearing mount 33, and thus when it is engaged by the shoes 24 and 25, it begins to rotate with them and the carrier plate 19.

If the load driven from the drum 25 is relatively light, as when the agitator 5 is being driven, then the shoes 23 and 24 will lock together the plate 19 and the drum 25 substantially immediately. If however the load to be driven is a relatively heavy one, as when the spin basket 2 is to be accelerated from a dead stop with a full load of water, then slippage occurs between the clutch shoes and the drum. In other words, the drum 25 will not be immediately rotated at the speed of the shaft 20 but rather will gradually pick up speed. This gradual acceleration provided by the slippage between the clutch shoes and the drum 25 limits the torque required by the motor and thereby prevents the motor from being overloaded as it accelerates the spin basket. It is contemplated that, within the context of my invention, shaft 20, carrier plate 19 and drum 25 together constitute a driving member or means for the other clutch parts to be described herebelow.

Positioned around the drum member 25 is a second cup shaped drum 34 which comprises the output or driven member of the mechanism 13. The output member 34 includes the output pulley 14 as an integral part thereof and it is journaled on the shaft 20 by means of a ball bearing mount 35. The output drum 34 can thus rotate relative to the shaft 20 so that it may be driven at a reduced speed as well as at shaft speed. As will now be explained, the output drum 34 is driven from the drum 25 and the manner of the drive means employed determines whether the drum 34 is driven at input shaft speed or at reduced speed.

In order to drive drum 34 at shaft speed, there is provided within mechanism 13 a coupling or intermediate means which is effective when operative to couple drum 25 continuously to the output or driven drum member 34. This coupling means comprises an intermediate member or carrier plate 36 which is journaled on the shaft 20 by means of a ball bearing mount 37, and a plurality of speed responsive or centrifugally operated movable members or clutch shoes which are pivotally mounted on the plate 36. The carrier plate 36 being journaled on the shaft 20 may move relative to the shaft and, in fact, may be held stationary as the shaft rotates. However, normally, due to friction in the bearing 35, it rotates with the shaft 20. In other words, plate 36 may be said to be yieldingly driven by shaft 20. This rotation, as will now be explained, results in the movable clutch shoes mounted on the intermediate or carrier plate 36 coupling together the drum 25 and the output drum 35 so that the drum 34 is driven at shaft speed.

To explain this action, it will be seen by reference to FIGURE 4 that the speed responsive or clutch shoe members mounted on the carrier plate 36 comprise four different shoes 38, 39, 40 and 41, these shoes being pivoted respectively on the plate 36 by mounting pins 42, 43, 44, and 45 which are respectively attached to extensions 46, 47, 48 and 49 on plate 36. The shoes 38 and 39 are curved members including clutch friction surfaces 50 and 51 disposed on the opposite sides of their respective pivots from the heavier portions or weights 52 and 53 of the shoes. The friction surfaces 50 and 51 are arranged to engage the outer annular surface of the drum 25, and such engagement takes place upon rotation of the carrier plate 36 at a predetermined speed as a result of the pivoting from a first position to a second position of members 38 and 39 on pins 42 and 43 respectively, the heavier parts 52 and 53 moving outwardly under the influence of centrifugal force and the lighter parts carrying the surfaces 50 and 51 consequently moving inwardly into their engaging position. This movement to the engaging position has the result of providing a positive drive between drum 25 and plate 36 so that the plate is positively driven at shaft speed. It will be seen that the friction surfaces 50 and 51 of shoes 38 and 39 engage drum 25 only if plate 36 is initially rotated due to the friction of the bearing 37. When plate 36 is held stationary, the shoes 38 and 39 are then held in their normal position out of engagement with drum 25 by means of the tension spring 54 and 55 which are connected respectively between the shoes 39 and 40 and shoes 38 and 41.

The other two clutch shoes 40 and 41 of the carrier plate 36 are adapted to provide a positive connection between the carrier plate 36 and the output drum 34 upon the rotation of the carrier plate by means 38 and 39. Specifically, shoes 40 and 41 are provided with friction pads 56 and 57 on their outer surfaces, and upon rotation of the carrier plate 36 at a relatively high speed the shoes are pivoted by centrifugal force so as to bring these friction pads into engagement with the inner annular surface of drum 34. This firmly locks the drum 34 to the carrier plate 36, and since the carrier plate is in turn locked to the drum 25 through shoes 38 and 39, it has the result that the output drum is driven at shaft speed; in other words, a positive connection is provided between the driving and the driven members. It will be noted, however, that just as the clutch shoes 38 and 39 are normally maintained out of engagement with drum 25 by the springs 54 and 55 when plate 36 is stationary, so the springs 54 and 55 are also effective to maintain the clutch shoes 40 and 41 normally out of engagement with the output drum 34. In other words, only when the shaft 20 rotates the carrier plate 36 through bearing 37 are the clutch shoes 40 and 41 pivoted to engage the output drum. When the carrier plate 36 is stationary, shoes 40 and 41 do not contact output drum 34 and it thereby may rotate freely with respect to the carrier plate. Any suitable means (not shown) may be provided, of course, on the carrier plate to limit movement of all the shoes 38, 39, 40 and 41 under the force of the springs 54 and 55 when the carrier plate is stationary so as to prevent the shoes from rubbing against the inner drum 25 at that time.

In summary, with respect to direct drive through the mechanism 13 whereby the output pulley or driven member 14 is driven at the same speed as the input shaft 20 through the drum or driving member 25, it will be seen that shaft 20 drives the clutch carrier 19 directly. The rotation of the carrier plate is transmitted to the drum 25 by means of centrifugally operated clutch shoes 23 and 24 mounted on plate 19, and the movement of drum 25 is in turn transmitted to the driven member or output drum 34 by means of the speed responsive or centrifugal clutch means mounted on the lower carrier plate or intermediate member 36.

As pointed out above, carrier plate 36, unless restrained, normally tends to rotate with shaft 20 due to bearing friction in the bearing 37, and upon this rotation the speed responsive clutches 38, 39, 40 and 41 mounted on plate 36 act to clutch the output drum 34 to the drum 25. Specifically, the shoes 38 and 39 clutch drum 25 to the carrier plate 36 and the shoes 40 and 41 clutch the carrier plate 36 to the output drum 34. Thus, the drum 25, the carrier plate 36, and the output drum 34 all rotate as a unit and at shaft speed, so that a direct continuous drive is provided between the input shaft and the output drum causing the output drum and pulley to rotate at input shaft speed. This rotation of the output pulley 14 is, of course, transmitted to the transmission 17 to provide a normal high speed drive for agitator 5 and spin basket 2.

It will further be seen that when the plate 36 is precluded from rotation as will be described herebelow there is no force causing the shoes 38, 39, 40, and 41 to connect driving member or drum 25 to the driven member or drum 34.

In the particular structure illustrated, it is contemplated that there may be provided a reduced speed drive for the output pulley 14 and thereby for the agitator 5 and spin basket 2. Specifically, viewing FIGURE 3, this structure includes a pair of speed responsive or centrifugally operated clutch shoes 58 and 59 which are carried by the output drum 34. Shoes 58 and 59 are formed as curved members positioned between drum 34 and drum 25, and they include respectively outwardly extending tabs 60 and 61 which fit into slots 62 and 63 respectively formed in the wall of the outer drum. The engagement between tabs 60 and 61 and their respective slots serves not only to mount shoes 58 and 59 on the output drum but also to provide a positive deriving connection whereby the shoes may drive the output drum. The fit between the tabs and the mounting slots 62 and 63 is, however, loose enough that shoes 58 and 59 may slide inwardly or outwardly with regard to the output drum.

It will be noted that the two shoes each include a friction surface on their inner sides, shoe 58 having a friction surface 64 and shoe 59 having a friction surface 65, and that the shoes are normally biased by means of tension springs 66 and 67 connected between them so that these friction surfaces engage drum 25. In other words, when the inner drum 25 is at rest it is contacted by the clutch shoes 58 and 59 so that as the inner drum begins to pick up speed, the outer drum 34 is driven from it through the clutch shoes 58 and 59.

As the output drum 34 accelerates, the centrifugal force created by its rotation begins to reduce the pressure with which the clutch shoes 58 and 59 engage the inner drum 25. The higher the speed of the output drum becomes, the smaller is the pressure between the clutch shoes and the inner drum, and the smaller the torque which they can transmit to the outer drum. The shoes, in fact, begin to slip with regard to drum 25. When a certain speed of the output drum is reached, the slippage between the shoes 58 and 59 and drum 25 becomes such that the shoes are ineffective to increase the speed of the output drum 34 and its connected load any further. In other words, they can supply the torque necessary to keep the output drum rotating at the same speed but they cannot supply any additional torque to increase the speed of the output drum any further. The output drum and its load thus stop accelerating and begin to rotate steadily at that particular speed.

This point, where the clutch shoes 58 and 59 slip sufficiently with regard to drum 25 that they stop accelerating the output drum 34, occurs at a speed well below the input shaft speed, and specifically occurs at the predetermined reduced speed of the output drum 34 which it is desired to transmit to the pulley 14 for the delicate operations of agitator 5 and basket 2. The speed of the output drum 34 at which the shoes 58 and 59 slip relative to the input drum 25 may be controlled by proper selection of the springs 66 and 67 as compared with the weight of the clutch shoes. For example, in one embodiment of the two speed clutch as described in the aforementioned Bochan patent, where a 1750 r.p.m. drive motor is provided shoes 58 and 59 stop accelerating output drum 34 and begin to drive with a steady speed when the output drum reaches a speed of about 910 r.p.m. Thus, a reduced speed of about 52% of the speed or high speed drive is provided.

In order for the structure to be operative, suitable means must be provided to preclude the rotation of carrier plate 36 so that, depending upon whether such rotation is precluded or not, a lower or higher speed is provided by the clutch from the drive motor to the agitator 5 and basket 2. It has heretofore been conventional to provide a member which frictionally prevents the rotation of the carrier plate by energization of a solenoid when such prevention is desired. Inasmuch as the means opposing the frictional force tending to make the carrier plate rotate is directly controlled by the operating solenoid in such a case, the solenoid must of necessity be made large enough so that it provides the force necessary to prevent rotation. By my invention, I provide a control assembly 18 for the clutch mechanism 13 wherein a very small solenoid member 67a of highly economical design may be used as a result of a modification in the manner of stopping the carrier plate.

Carried on shoes 38 and 39 of carrier plate 36, at the light end of each shoe, are respectively formed downwardly extending stop sections 68 and 69; preferably, the sections 68 and 69 are generally parallel to the axis of rotation of plate 36. It will thus readily be seen that the downwardly extending stop sections 68 and 69 are each movable between two radial positions relative to the common axis of all the rotating parts of the assembly 13. When plate 36 is stationary or rotating below the predetermined speed, the stop sections 68 and 69 are in a first or outer radial position as shown, and when the predetermined speed of rotation is reached and members 38 and 39 pivot on pins 42 and 43 respectively, the stop sections 68 and 69 move to second inner radial positions.

Assembly 18 includes a spring member 70 which is secured between the base 71 of the assembly and a control or stop member 72 pivoted on an upwardly extending part 73. Member 72, which preferably extends at a substantial angle to stop sections 68 and 69 (for instance, as shown, it may extend generally radially with respect to the rotating parts), includes an end portion 74. When the spring 70 pivots the member 72 about point 73 to an inoperative position, as shown, in FIGURE 2, it will be seen that end 74 is then below the lowermost part of either of stop sections 68 and 69 so that regardless of any radial movement they may incur they will not be engaged by the end 74 of member 72. Thus, there is no restraining force on the plate 36 and it may rotate in order to provide the direct connection between drum 25 and drum 34 so as to cause the drum 34 to be driven at full motor speed.

Where it is desired to prevent rotation of carrier plate 36, solenoid 67a is energized and this pulls down the end 74 of member 72, it being understood that at least end 75 of the member 72, and preferably the entire member, is formed of a ferromagnetic material. It will be seen that the solenoid 67a needs to be strong enough only to overcome spring 70 which may be made very light thus permitting a very small solenoid to be used. When the solenoid is energized, member 72 pivots counter clockwise to raise end 74 to its operative position. Then, when stop sections 68 and 69 are in their outer radial position, the end 74 of member 72 is directly in their path. As a result, plate 36 will rotate less than half a circle before one of the two stop sections 68 and 69 strikes end 74 and is stopped thereby, the stopping action being not as a result of the strength of the solenoid but being provided in an economical fashion by the relative rigidity of the parts 73 and 72.

It will be readily apparent that this type of a control construction is more economical than that previously used due to the fact that the solenoid need not exert the stopping force itself but need only move the stop or control member 72 which then provides the stopping force without dependence on the solenoids.

It is, of course, most undesirable that a high speed strike occur between end 74 of the member 72 and one of the stop sections 68 and 69 as a result of energization of solenoid 67a during high speed rotation of the plate 36. This possibility is entirely eliminated by structure as described due to the fact that, as the plate 36 comes up to a speed where the impact between one of the stop sections 68 and 69 and end 74 of member 72 might cause damage, the shoes 38 and 39 pivot. This causes stop sections 68 and 69 both to move to inner radial positions in which they are located inwardly beyond the end of member 74. As a result, even if the solenoids should be energized, no striking of stop sections 68 and 69 against end 74 can occur because the stop sections are now spaced radially inward from the end 74. Only when the speed decreases sufficiently to permit the stop sections 68 and 69 to return to their outer radial positions can striking occur, and it will be understood that by suitable design this speed is caused to be low enough so that no damage is caused by that impact.

In summary it will be seen that my improved control arrangement either permits or prevents rotation of carrier plate 36 by the shaft 20. It will further be seen that this action is effected by a highly economical structure without any danger of damage as a result of the particular structure provided. It will be observed that, while my structure is provided in particular connection with a two speed clutch in a washing machine for illustrative purposes, it may readily be utilized in a single speed clutch structure where a member responsive to speed of rotation of an intermediate member causes engagement of driving and driven members at a certain speed and otherwise precludes such engagement.

Thus, while in accordance with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desired to secure by Letters Patent of the United States is:

1. A clutch comprising: coaxial driving and driven means; connecting means coaxial with and yieldingly driven by said driving means, said connecting means including means movable from a first position to a second position in response to centrifugal force at a predetermined speed, said movable means in said second position connecting said driving means to said driven means, said movable means having a stop section formed thereon, said stop section being in a first radial position when said movable means is in said first position and being in a second radial position when said movable means is in said second position; control means including a control member movable between an operative position and an inoperative position and means for so moving said control member, said control member in its inoperative position being removed from the rotary path of said stop section in either radial position of said stop section, said control member in its operative position being in the rotary path of said stop section when said stop section is in said first radial position thereby to prevent rotation of said connecting means and being out of the rotary path of said stop section when said stop section moves to said second radial position.

2. A clutch comprising: coaxial driving and driven mean; connecting means coaxial with said driving and driven means; bearing means rotatably mounting said connecting means on said driving means, said connecting means being rotatable by said driving means through the friction in said bearing means, said connecting means including means movable from a first position to a second position in response to centrifugal force at a predetermined speed, said movable means in said second position connecting said driving means to said driven means, said movable means having a stop section formed thereon, said stop section being in a first radial position when said movable means is in said first position and being in a second radial position when said movable means is in said second position, control means including a control member movable between an operative position and an inoperative position and means for so moving said control member, said control member in its inoperative position being removed from the rotary path of said stop section in either radial position of said stop section, said control member in its operative position being in the rotary path of said stop section when said stop section is in said first radial position thereby to prevent rotation of said connecting means and being out of the rotary path of said stop section when said stop section moves to said second position.

3. A clutch comprising: coaxial driving and driven means; connecting means coaxial with and yieldingly driven by said driving means, said connecting means including means movable from a first position to a second position in response to centrifugal force at a predetermined speed, said movable means in said second position connecting said driving means to said driven means, said movable means having a stop section formed thereon extending substantially parallel to the axis of rotation, said stop section being in a first radial position when said movable means is in said first position and being in a second radial position when said movable means is in said second position; control means including a control member extending generally radially toward said axis and axially movable between an operative position and an inoperative position, and means for so moving said control member, said control member in its inoperative position being axially displaced from said stop section, said control member in its operative position being axially coincident with said stop section and extending across the rotary path thereof when said stop section is in said first radial position thereby to prevent rotation of said connecting means, and being out of the rotary path of said stop section when said stop section moves to said second radial position.

4. The apparatus defined in claim 1 wherein said means for moving said control member comprises an electromagnetic solenoid member and a spring, said spring normally biasing said control member to one of its positions and said electromagnetic solenoid member overcoming said spring and moving said control member to its other position when energized.

5. The apparatus defined in claim 1 wherein said stop section is positioned on said movable means so that said first radial position of said stop section is radially outward of said second radial position thereof.

6. A clutch comprising: coaxial driving and driven means each having an annular surface formed thereon; connecting means coaxial with and yieldingly driven by said driving means, said connecting means including a pair of members each movable from a first position to a second position in response to centrifugal force, a first of said members having a portion moving inwardly in response to centrifugal force into engagement with the annular surface of one of said driving and driven means, the second of said movable members having a portion moving outwardly in response to centrifugal force into engagement with the other of said driving and driven means, said movable members in their second positions thereby connecting said driving means to said driven means, one of said movable members having a stop section formed thereon, said stop section being in a first radial position when said one movable member is in said first position and being in a second radial position when said one movable member is in said second position; control means including a control member movable between an operative position and an inoperative position, and means for so moving said control member, said control member in its inoperative position being removed from the rotary path of said stop section in either radial position of said stop section, said control member in its operative position being in the rotary path of said stop section when said stop section is in said first radial position thereby to prevent rotation of said connecting means and being out of the rotary path of said stop section when said stop section moves to said second radial position.

7. The apparatus defined in claim 6 wherein said first movable member engages said driving means upon its inward movement to its second position and said second movable member engages said driven means upon its movement to its second position.

8. A clutch comprising: coaxial driving and driven means; connecting means coaxial with and yieldingly driven by said driving means, said connecting means including a pair of means each movable from a first position to a second position in response to centrifugal force at a predetermined speed, said movable means being secured on said connecting means on diametrically opposite sides of the axis of rotation, said movable means in their second position each connecting said driving means to said driven means, said movable means each having a stop section formed thereon, said stop sections being in a first radial position when said movable means are in said first position and being in a second radial position when said movable means are in said second position; control means including a control member movable between an operative position and an inoperative position, and means for so moving said control member, said control member in its inoperative position being removed from the rotary path of said stop sections in either radial position of said stop sections, said control member in its operative position being in the rotary path of said stop sections when said stop sections are in their first radial position thereby to prevent rotation of said connecting means and being out of the rotary path of said stop sections when said stop sections move to their second position.

References Cited in the file of this patent
UNITED STATES PATENTS

| | | |
|---|---|---|
| 1,810,317 | Lasker | June 16, 1931 |
| 2,255,591 | Simpson | Sept. 9, 1941 |
| 2,313,717 | Armantrout | Mar. 16, 1943 |
| 2,314,042 | Haigh | Mar. 16, 1943 |
| 2,809,535 | Hein et al. | Oct. 15, 1957 |
| 2,869,699 | Bochaw | Jan. 20, 1959 |